(12) United States Patent
Richards-Johnson et al.

(10) Patent No.: US 8,974,993 B2
(45) Date of Patent: Mar. 10, 2015

(54) UV RED FLUORESCENT EA TONER

(71) Applicant: Xerox Corporation, Norwalk, CT (US)

(72) Inventors: Roxan Richards-Johnson, Milton (CA);
Jordan H Wosnick, Toronto (CA);
Karen A Moffat, Brantford (CA);
Edward Graham Zwartz, Mississauga (CA); Britawit Asfaw, Oakville (CA);
Richard P N Veregin, Mississauga (CA); Cuong Vong, Hamilton (CA);
Eric Rotberg, Toronto (CA)

(73) Assignee: Xerox Corporation, Norwalk, CT (US)

( * ) Notice: Subject to any disclaimer, the term of this patent is extended or adjusted under 35 U.S.C. 154(b) by 17 days.

(21) Appl. No.: 13/741,628

(22) Filed: Jan. 15, 2013

(65) Prior Publication Data
US 2014/0197364 A1 Jul. 17, 2014

(51) Int. Cl.
*G03G 9/08* (2006.01)
*G03G 9/097* (2006.01)
*C09K 11/06* (2006.01)

(52) U.S. Cl.
CPC .............. *G03G 9/0975* (2013.01); *C09K 11/06* (2013.01)
USPC .................. 430/108.1; 430/109.4; 430/110.2

(58) Field of Classification Search
CPC .................................................... G03G 9/0975
USPC ................................ 430/110.2, 108.1, 109.4
See application file for complete search history.

(56) References Cited

U.S. PATENT DOCUMENTS

| | | | | |
|---|---|---|---|---|
| 3,398,099 | A * | 8/1968 | Kleinerman | 252/301.18 |
| 4,247,597 | A * | 1/1981 | Russell, Jr. | 430/111.35 |
| 5,800,602 | A * | 9/1998 | Baur et al. | 430/108.2 |
| 7,585,605 | B2 * | 9/2009 | Nakamura | 430/108.4 |
| 8,431,294 | B2 * | 4/2013 | Haruki et al. | 430/108.2 |
| 8,673,527 | B2 * | 3/2014 | Yang et al. | 430/108.2 |
| 2005/0208087 | A1 * | 9/2005 | Kuerzinger et al. | 424/405 |
| 2007/0042286 | A1 * | 2/2007 | Vanbesien et al. | 430/137.14 |
| 2009/0059252 | A1 * | 3/2009 | Coyle et al. | 430/108.2 |
| 2009/0214972 | A1 * | 8/2009 | Wosnick et al. | 430/108.2 |
| 2010/0086867 | A1 * | 4/2010 | Iftime et al. | 430/108.4 |
| 2011/0143274 | A1 * | 6/2011 | Iftime et al. | 430/108.2 |
| 2012/0237865 | A1 * | 9/2012 | Kazmaier et al. | 430/107.1 |
| 2013/0071782 | A1 * | 3/2013 | Takamiya et al. | 430/105 |
| 2013/0224643 | A1 * | 8/2013 | Takamiya et al. | 430/108.6 |

FOREIGN PATENT DOCUMENTS

JP 2009205157 A * 9/2009

OTHER PUBLICATIONS

Bauer, Herbert et al. "Octacoordinate Chelates of Lanthanides: Two Series of Compounds" J. Am. Chem. Soc., 86 (23), pp. 5125-5131 (1964).*
Melby, L. R. et al. "Synthesis and Fluorescence of Some Trivalent Lanthanide Complexes" J. Am. Chem. Soc., 86 (23), pp. 5117-5125 (1964).*

* cited by examiner

Primary Examiner — Christopher Rodee
(74) Attorney, Agent, or Firm — MDIP LLC

(57) ABSTRACT

The present disclosure relates to a toner design for a clear UV red fluorescence toner having a high lanthanide complex pigment loading, including methods of making the fluorescence toner using a saccharide or a sugar acid to avoid complexation of lanthanide ions from the pigment, with lower aggregation and coalescence temperatures in the preparation of toner particles, where the particles exhibit a narrow size distribution and good xerographic performance.

15 Claims, No Drawings

UV RED FLUORESCENT EA TONER

TECHNICAL FIELD

The present disclosure relates to toners suitable for an electrophotographic apparatus and processes for making such toners, where such toners can be clear under visible light but will provide an evident red image under appropriate incident light. The toners can be used in security applications.

BACKGROUND INFORMATION

Toner blends containing crystalline or semi-crystalline polyester resins with an amorphous resin have been recently shown to provide desirable low melt fusing (also including ultra low melt or ULM), which is important for high speed printing, lower fuser power consumption or both. Toners containing crystalline polyesters are suitable for both emulsion aggregation (EA) toners and conventional jetted toners.

Fluorescent inks, dyes and toners may be used as an authenticating feature in the document security industry. Secure documents, for example, documents that are difficult to forge, may be conventionally created using inks that include fluorescent agents either alone or in combination with ordinary inks and/or pigments. Features printed using fluorescent inks are usually invisible under visible light due to the colorless nature of the security inks or due to masking by other colorants in the document. Under proper illumination, the fluorescent features of the document are revealed in the form of a bright emission by the fluorescent dyes in the visible spectrum. For example, certain bank notes utilize visible features, such as holographic patches, microprinting and microtextures to conceal additional fluorescent threads and/or multicolored emblems embedded in the bank note, which are only revealed under specific light frequencies. Those features provide an increased level of security and authenticity against counterfeiters by making the copying of such a document more difficult.

Although fluorescent inks are available as described above, the use of toners for printing security features is somewhat limited. For example, U.S. Pat. No. 5,554,480, the disclosure of which is hereby incorporated by reference in entirety, describes the use of ordinary organic fluorescent dyes which are applied via non-electrophotographic methods (flexo printing, inkjet and the like). Furthermore, available fluorescent toners may appear colored under visible light, which defeats usefulness as a hidden or invisible security feature.

Improved methods for producing toners which are suitable for use in security documents remain desirable.

SUMMARY

The present disclosure relates to a visibly clear UV red fluorescent toner using a lanthanide complex under normal light, including methods of making such a toner using a stabilizer as an alternative to an ion binding agent, such as the commonly used EDTA to avoid complexing of lanthanide ions to free particle growth, and including reduced aggregation and coalescence temperatures, where the resulting particles exhibit higher fluorescence pigment loading, a narrow size distribution and good xerographic performance.

In embodiments, a UV red fluorescent toner is disclosed including a pigment containing a lanthanide complex, at least one amorphous resin, at least one crystalline resin, an aggregating agent, a saccharide or a sugar acid, optionally a surfactant and an optional wax, where the toner exhibits an absorption $\lambda_{max}$ of between of about 330 nm to 380 nm and an emission $\lambda_{max}$ of between about 612 nm to about 618 nm.

In embodiments, a UV red fluorescent clear toner is disclosed including a pigment containing a europium (III) complex, at least one amorphous resin, at least one crystalline resin, an aggregating agent, a gluconic acid or salt thereof, optionally a surfactant and an optional wax, where the europium (III) complex includes tris(dibenzoylacetonato)-mono(phenanthroline)-europium (III); tris(dibenzoylmethane)-mono(phenanthroline)-europium (III); tris(dibenzoylmethane)-mono(5-aminophenanthroline)-europium (III); tris(dinapthoylmethane)-mono(phenanthroline)-europium (III); tris(4-bromobenzoylmethane)-mono(phenanthroline)-europium (III); tris(dibiphenoylmethane)-mono(phenanthroline)-europium (III); tris(dibenzoylmethane)-mono(4,7-diphenylphenanthroline)-europium (III); and tris(dibenzoylmethane)-mono(4,7-dimethylphenanthroline)-europium (III), and the like, and where the toner exhibits an absorption $\lambda_{max}$ of between about 330 nm to 380 nm and an emission $\lambda_{max}$ of between about 612 nm to about 618 nm.

In embodiments, a method of preparing a UV red fluorescent toner is disclosed including contacting at least one amorphous resin, at least one crystalline resin, an optional color pigment, an aggregating agent, an optional wax, and at least one fluorescent pigment comprising a lanthanide complex to form a fluorescent latex; homogenizing and aggregating said fluorescent latex to form a mixture, where the aggregating is carried out at about 35° C.; contacting the mixture with a gluconic acid salt; then coalescing the mixture, where the coalescing is carried out at about 70° C.; and recovering the resulting fluorescent toner particles.

Those and other improvements are accomplished by the compositions and methods described in embodiments herein.

DETAILED DESCRIPTION

UV red fluorescent toners containing pigments that are made from lanthanide complexes are disclosed. Those pigments are white to off-white under visible light but can provide red fluorescence under suitable wavelength incident UV radiation (315-400 nm).

In the prior design of UV red fluorescent emulsion aggregation ultra low melt (EA-ULM) toners, EDTA as the chelating agent to remove $Al^{3+}$ during freezing results in complexing of a lanthanide ion, such as, europium (III) ions, from the pigment which reduces the red fluorescence intensity of the toner. That reduction in fluorescence intensity also is observed as the temperature of the reaction is increased to coalescence temperatures (i.e., about 85° C.).

Synthesis of toner particles without EDTA and using only high pH conditions to freeze aggregation, results in a toner with an average particle size of about 10 μm, for example, with 4% DFKY-C7 (a red fluorescent dye, Risk Reactor, Calif.) loading at 85° C. coalescence, and there is a marked decrease in red fluorescence intensity.

In embodiments, a toner design is disclosed for visibly clear UV red fluorescing toner under normal light. The toner composition has an increased loading of UV fluorescent pigment (e.g., 10 wt % with LUREDP7), particles in the 5.8 to 7 μm particle size range, with narrow distribution, and good xerographic performance. In embodiments, the process includes reducing aggregation temperature to about 35° C. and lowering the amount of flocculent to about 0.3 pph metal ion/toner ratio. That resulted in slow, controlled growth of the toner particles. Changing the chelating agent from EDTA to a stabilizer, such as, a saccharide or a sugar acid, or salt thereof, such as, gluconic acid, while adjusting to a pH of about 7.8 to about 8.9 gave toner particles with a particle size (d50) of 6.15, $GSD_v$ of 1.37 and $GSD_n$ of 1.41. Further, reducing coalescence temperature to about 70° C. gave toner particles with acceptable circularity, as seen under a light microscope, without reducing red fluorescence intensity.

Before the present composition, methods and methodologies are described, it is to be understood that the subject matter of interest is not limited to particular compositions, methods and experimental conditions described, as such compositions, methods and conditions may vary. It is also to be understood that the terminology used herein is for purposes of describing particular embodiments only, and is not intended to be limiting. The disclosure is not limited to the particular embodiments described herein, and some components and processes may be varied by one of ordinary skill, based on the disclosure.

In the specification and the claims that follow, singular forms, such as, "a," "an," and, "the," include plural forms unless the content clearly dictates otherwise. All ranges disclosed herein include, unless specifically indicated, all endpoints and intermediate values. In addition, reference may be made to a number of terms defined below.

The term, "functional group," refers, for example, to a group of atoms arranged in a way that determines the chemical properties of the group and the molecule to which it is attached. Examples of functional groups include halogen atoms, hydroxyl groups, carboxylic acid groups and the like.

"Optional," or, "optionally," refers, for example, to instances in which subsequently described circumstance may or may not occur, and include instances in which the circumstance occurs and instances in which the circumstance does not occur.

The terms, "one or more," and, "at least one," refer, for example, to instances in which one of the subsequently described circumstances occurs, and to instances in which more than one of the subsequently described circumstances Occurs.

Unless otherwise indicated, all numbers expressing quantities and conditions, and so forth used in the specification and claims are to be understood as being modified in all instances by the term, "about." "About," is meant to indicate a variation of no more than 20% from the stated value. Also used herein is the term, "equivalent," "similar," "essentially," "substantially," "approximating" and "matching," or grammatic variations thereof, have generally acceptable definitions or at the least, are understood to have the same meaning as, "about."

As used herein, "under visible light," "under normal light," and, "under ambient light," are used interchangeably as equivalents and is meant to refer or to relate to visualizing an object under sunlight or daylight or the equivalent using indoor lighting, such as, fluorescent lights or incandescent lights, and generally predominantly of all wavelengths of electromagnetic radiation between 380 nm and 740 nm.

One skilled in the art will recognize that where methods or compositions are disclosed, the invention encompasses not only such compositions or processes and other subcomponents or positive process steps, but may also exclude one or more components, subcomponents, functional groups, elements, additives, or steps therein, as used, for example, in an explicit negative limitation. The disclosure therefore envisages the explicit exclusion of any one or more components, subcomponents, functional groups, elements, additives, species or embodiments, including provisos that may apply to any of the disclosed embodiments, whereby any one or more components, subcomponents, elements, functional groups, species or embodiments and the like, may be excluded.

Resins

Any monomer suitable for preparing a latex may be used in the present processes. Suitable monomers useful in forming the latex and thus, the resulting latex particles in the resin latex include, but are not limited to, styrenes, acrylates, methacrylates, butadienes, isoprenes, acrylic acids, methacrylic acids, acrylonitriles, mixtures thereof and the like. Any monomer employed may be selected depending on the particular latex polymer to be utilized.

In embodiments, the resin of the latex may include at least one polymer. In embodiments, at least one is from about one to about twenty and, in embodiments, from about three to about ten.

Examples of latex resins or polymers which may be used include, but are not limited to, poly(styrene-butadiene), poly (methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), and poly(styrene-butyl acrylate-acrylonitrile-acrylic acid) and combinations thereof. The polymer may be block, random or alternating copolymers.

In embodiments, the polymer utilized to form the latex may be a polyester resin, including the resins described in U.S. Pat. Nos. 6,593,049 and 6,756,176, the disclosure of each of which hereby is incorporated by reference in entirety. The toners may also include a mixture of an amorphous polyester resin and a crystalline polyester resin as described in U.S. Pat. No. 6,830,860, the disclosure of which is hereby incorporated by reference in entirety.

In embodiments, the resin may be a polyester resin formed by reacting a diol with a diacid in the presence of an optional catalyst. For forming a crystalline polyester, suitable organic diols include aliphatic diols with from about 2 to about 36 carbon atoms, such as, 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, mixtures thereof, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixtures thereof, and the like. The diol may be, for example, selected in an amount of from about 45 to about 60 mole % of the resin.

Examples of organic diacids or diesters selected for the preparation of the crystalline resins include oxalic acid, succinic acid, glutaric acid, adipic acid, suberic acid, azelaic acid, sebacic acid, fumaric acid, maleic acid, dodecanedioic acid, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, mixtures thereof, a diester or anhydride thereof, and an alkali sulfo-organic diacid such as the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate or mixtures thereof. The organic diacid may be selected in an amount of, for example, from about 40 to about 50 mole % of the resin.

Suitable crystalline resins include those disclosed in U.S. Publ. No. 2006/0222991, the disclosure of which is hereby incorporated by reference in entirety. In embodiments, a suitable crystalline resin may be composed of ethylene glycol and a mixture of dodecanedioic acid and fumaric acid co-monomers.

In embodiments, a suitable crystalline resin utilized in a toner of the present disclosure may have a number average molecular weight (Mn) of from about 500 to about 3,000, in embodiments, from about 1000 to about 2,000.

Examples of amorphous resins which may be utilized include poly(styrene-acrylate) resins, for example, poly(styrene-acrylate) resins, poly(styrene-methacrylate) resins, crosslinked poly(styrene-methacrylate) resins, poly(styrene-butadiene) resins, crosslinked poly(styrene-butadiene) resins, polyester resins, branched polyester resins, alkali sulfonated-polyester resins, branched alkali sulfonated-polyester resins, alkali sulfonated-polyimide resins, branched alkali sulfonated-polyimide resins, alkali sulfonated poly(styrene-acrylate) resins, crosslinked alkali sulfonated poly(styrene-acrylate) resins, poly(styrene-methacrylate) resins, crosslinked alkali sulfonated-poly(styrene-methacrylate) resins, alkali sulfonated-poly(styrene-butadiene) resins, and crosslinked alkali sulfonated poly(styrene-butadiene) resins. Polyester resins may be useful in embodiments, such as poly(ethylene terephthalate), poly(propylene terephthalate), poly(diethylene terephthalate), poly(propylene-diethylene terephthalate), poly(propylene-butylene terephthalate), poly(propoxylated bisphenol-A fumarate), poly(ethoxylated bisphenol-A-fumarate), copoly(ethoxylated bisphenol-A-maleate) and the like. The resins may be crosslinked. The resins can be used in amounts from about 25% to about 70% of the total resins used.

Examples of diacid or diesters selected for the preparation of amorphous polyesters include dicarboxylic acids or diesters, such as, terephthalic acid, phthalic acid, isophthalic acid, fumaric acid, maleic acid, succinic acid, itaconic acid, succinic acid, succinic anhydride, dodecenylsuccinic acid, dodecenylsuccinic anhydride, glutaric acid, glutaric anhydride, adipic acid, pimelic acid, suberic acid, azelic acid, dodecanedioic acid, dimethyl terephthalate, diethyl terephthalate, dimethyl isophthalate, diethyl isophthalate, dimethyl phthalate, phthalic anhydride, diethyl phthalate, dimethyl succinate, dimethyl fumarate, dimethyl maleate, dimethyl glutarate, dimethyl adipate, dimethyl dodecenylsuccinate and combinations thereof. The organic diacid or diester may be selected, for example, from about 45 to about 52 mole % of the resin.

Examples of diols utilized in generating the amorphous polyester include 1,2-ethanediol, 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, dipropylene glycol, dibutylene and combinations thereof. The amount of organic diol selected can vary, and may be, for example, from about 45 to about 52 mole % of the resin.

Polycondensation catalysts which may be utilized for either the crystalline or amorphous polyesters include tetraalkyl titanates, dialkyltin oxides, such as, dibutyltin oxide, tetraalkyltins, such as, dibutyltin dilaurate, dialkyltin oxide hydroxides, such as, butyltin oxide hydroxide, aluminum alkoxides, alkyl zinc, dialkyl zinc, zinc oxide, stannous oxide or combinations thereof. Such catalysts may be utilized in amounts of, for example, from about 0.01 mole % to about 5 mole % based on the starting diacid or diester used to generate the polyester resin.

In embodiments, a suitable amorphous resin utilized in a toner of the present disclosure may be a low molecular weight amorphous resin, sometimes referred to, in embodiments, as an oligomer, having a weight average molecular weight (Mw) of from about 10 kg/mol to about 25 kg/mol, in embodiments, from about 15 kg/mol to about 20 kg/mol. The oligomer may possess a glass transition temperature (Tg) of from about 50° C. to about 65° C., in embodiments, from about 55° C. to about 60° C. The oligomer may possess a softening point (Ts) of from about 90° C. to about 105° C., in embodiments, from about 95° C. to about 100° C.

A toner of the present disclosure may comprise a high molecular weight amorphous resin having an Mw of from about 50 kg/mol to about 80 kg/mol, in embodiments, from about 60 kg/mol to about 70 kg/mol, a Tg of from about 50° C. to about 65° C., in embodiments, from about 55° C. to about 60° C. and a Ts of from about 105° C. to about 150° C., in embodiments, from about 110° C. to about 130° C.

In addition, polyester resins obtained from the reaction of bisphenol A and propylene oxide or propylene carbonate, such as, polyesters followed by the reaction of the resulting product with fumaric acid (as disclosed in U.S. Pat. No. 5,227,460, the entire disclosure of which is incorporated herein by reference), and branched polyester resins resulting from the reaction of dimethylterephthalate with 1,3-butanediol, 1,2-propanediol, pentaerythritol, trimethylolethane, trimethylolpropane, 1,3,5-trihydroxymethylbenzene, sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, and other trihydric or higher polyhydric alcohol components may also be used.

In embodiments, an unsaturated polyester resin may be utilized as a latex resin. Examples of such resins include those disclosed in U.S. Pat. No. 6,063,827, the disclosure of which hereby is incorporated by reference in entirety. Exemplary unsaturated polyester resins include, but are not limited to, poly(propoxylated bisphenol A co-fumarate), poly(ethoxylated bisphenol A co-fumarate), poly(butyloxylated bisphenol A co-fumarate), poly(co-propoxylated bisphenol A co-ethoxylated bisphenol A co-fumarate), poly(1,2-propylene fumarate), poly(propoxylated bisphenol A co-maleate), poly(ethoxylated bisphenol A co-maleate), poly(butyloxylated bisphenol A co-maleate), poly(co-propoxylated bisphenol A co-ethoxylated bisphenol A co-maleate), poly(1,2-propylene maleate), poly(propoxylated bisphenol A co-itaconate), poly(ethoxylated bisphenol A co-itaconate), poly(butyloxylated bisphenol A co-itaconate), poly(co-propoxylated bisphenol A co-ethoxylated bisphenol A co-itaconate), poly(1,2-propylene itaconate) and combinations thereof.

In embodiments, a suitable polyester resin which may be utilized may be a poly(propoxylated bisphenol A co-fumarate) resin having a degree of polymerization from about 12 to about 240.

An unsaturated polyester resin may be prepared by (i) reacting an organic diol with a cyclic alkylene carbonate in the presence of a first catalyst to thereby form a polyalkoxy diol, and (ii) optionally adding thereto a further amount of cyclic alkylene carbonate in the presence of a second catalyst, and (iii) subsequently polycondensing the resulting mixture with a dicarboxylic acid.

In embodiments, a branched polyester resin may be utilized. Such resins include those disclosed in U.S. Pat. No. 6,291,122, the disclosure of which is hereby incorporated herein by reference in entirety. Such a branched resin may have a branching component, such as, a polyhydric alcohol, such as, trimethylolethane, trimethylolpropane, 1,3,5-trihydroxymethylbenzene, sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol and other trihydric or higher polyhydric alcohol components. In embodiments, the branched polyester resin may be a branched poly(propoxylated bisphenol A co-fumarate) where the main chain has an overall degree of polymerization from about 12 to about 240 and the branched portion has an overall degree of polymerization from about 1 to about 240.

One, two or more resins may be used in forming a toner. In embodiments where two or more resins are used, the resins may be in any suitable ratio (e.g., weight ratio), such as, for instance, from about 1% (first resin)/99% (second resin) to about 99% (first resin)/1% (second resin), in embodiments, from about 10% (first resin)/90% (second resin) to about 90% (first resin)/10% (second resin).

The polymer resin may be present in an amount of from about 65 to about 95% by weight, from about 75 to about 85% by weight of the toner particles (that is, toner particles exclusive of external additives) on a solids basis. In embodiments, when a crystalline resin is used, the ratio of crystalline resin to amorphous resin can be from about 1:99 to about 30:70, such as, from about 5:95 to about 25:75, from about 5:95 to about 15:95.

In embodiments, when two amorphous polyester resins are utilized, one of the amorphous polyester resins may be of high molecular weight (HMW) and the second amorphous polyester resin may be of low molecular weight (LMW).

As used herein, an HMW amorphous resin may have, for example, a weight average molecular weight ($M_w$) greater than about 55,000, for example, from about 55,000 to about 150,000, from about 50,000 to about 100,000, from about 60,000 to about 95,000, from about 70,000 to about 85,000, as determined by gel permeation chromatography (GPC), using polystyrene standards.

An HMW amorphous polyester resin may have an acid value of from about 8 to about 20 mg KOH/grams, from about 9 to about 16 mg KOH/grams, from about 11 to about 15 mg KOH/grams. HMW amorphous polyester resins, which are available from a number of commercial sources, can possess various melting points of, for example, from about 30° C. to about 140° C., from about 75° C. to about 130° C., from about 100° C. to about 125° C., from about 115° C. to about 121° C.

An LMW amorphous polyester resin has, for example, an $M_w$ of 50,000 or less, from about 2,000 to about 50,000, from about 3,000 to about 40,000, from about 10,000 to about 30,000, from about 15,000 to about 25,000, as determined by GPC using polystyrene standards. The LMW amorphous polyester resins, available from commercial sources, may have an acid value of from about 8 to about 20 mg KOH/grams, from about 9 to about 16 mg KOH/grams, from about 10 to about 14 mg KOH/grams. The LMW amorphous resins can possess an onset $T_g$ of from about 40° C. to about 80° C., from about 50° C. to about 70° C., from about 58° C. to about 62° C., as measured by, for example, differential scanning calorimetry (DSC).

A latex resin suitable for use herein may be formed by any method within the purview of those skilled in the art. In embodiments, emulsion polymerization processes may be utilized to form the latex resin. In the emulsion polymerization process, the reactants for forming the resin may be added to a suitable reactor, such as, a mixing vessel. The appropriate amount of monomers, optional stabilizer, surfactant(s), initiator, if any, chain transfer agent, if any, and wax, if any, and the like may be combined in the reactor and the emulsion polymerization process may be allowed to begin. Reaction conditions selected for effecting the emulsion polymerization include temperatures of, for example, from about 45° C. to about 120° C., in embodiments, from about 60° C. to about 90° C. In embodiments the polymerization may occur at elevated temperatures within about 10% of the melting point of any wax present, from about 60° C. to about 85° C., in embodiments, from about 65° C. to about 80° C., to permit the wax to soften thereby promoting dispersion and incorporation into the emulsion.

In other embodiments, pre-formed or pre-made resins may be obtained and utilized to form toners utilizing methods within the purview of those skilled in the art.

In embodiments, the resins may or may not contain additional functional groups (e.g., carboxyl, carbonyl, aldehydes, ketones, esters, ethers, amines, amides, sulfo, alkyl and the like). Further, the toner as disclosed, and as taught above, may contain resins that are cross-linked, and in embodiments, to a degree to form a gel.

Surfactants

In embodiments, resins, waxes and other components utilized to form fluorescent agents may be in dispersions including surfactants. Moreover, fluorescent agent-containing particles may be formed by emulsion methods where the resin and other components of the fluorescent agent are placed in one or more surfactants, an emulsion is formed. The surfactant then can be distilled away.

One, two or more surfactants may be utilized. The surfactants may be selected from ionic surfactants and nonionic surfactants. Anionic surfactants and cationic surfactants are encompassed by the term, "ionic surfactants." In embodiments, the surfactant may be utilized so that it is present in an amount of from about 0.01% to about 5% by weight of the fluorescent additive composition, from about 0.75% to about 4% by weight of the fluorescent additive composition, in embodiments, from about 1% to about 3% by weight of the fluorescent additive composition.

Examples of nonionic surfactants that can be utilized include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc as IGEPAL CA-210™, IGEPAL CA-520™, IGEPAL CA-720™, IGEPAL CO-890™, ANTAROX 890™, ANTAROX 890™, IGEPAL CO-720™, IGEPAL CO-290™ and IGEPAL CA-210™. Other examples of suitable nonionic surfactants include a block copolymer of polyethylene oxide and polypropylene oxide, including those commercially available as SYNPERONIC PE/F, in embodiments, SYNPERONIC PE/F 108.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Co., and/or TAYCA POWER BN2060 from Tayca Corp., JP, which are branched sodium dodecyl benzene sulfonates.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Combinations of those surfactants may be utilized in embodiments.

Fluorescent Pigments/Agents

In embodiments, fluorescent pigments (agents) include the class of rare earth metal (e.g., lanthanide metal) complexes that fluoresce. In embodiments, such complexes comprise chelated organic ligands, e.g., rare earth coordination complexes. Without wishing to be bound by theory or mechanism, it is believed that rare earth metal chelate complexes absorb incoming photons primarily via the ligand. The excited state electrons primarily on the ligand are transferred via a nonradiative pathway to the metal center. From there, the electrons relax (in the case of Lanthanides) via what is recognized to be a singlet $^5D_0$ to triplet $^7F_2$ transition, emitting (visible) photonic energy in the process. In embodiments, rare earth metal centers include terbium, dysprosium, europium and samarium. In those metals, the quantum efficiency is high (>0.5) and there are few competitive non-radiative pathways for that transition.

Europium-based rare earth compounds are commercially available. U.S. Pat. No. 5,837,042, which is incorporated by reference in entirety, discloses many specific examples of rare earth-based fluorescent compounds and ligands. Structural examples may include those disclosed by American Dye Source, Inc., and include Tris(dibenzoylacetonato)-mono(phenanthroline)-europium (III); Tris(dibenzoylmethane)-mono(phenanthroline)-europium (III); Tris(dibenzoylmethane)-mono(5-aminophenanthroline)-europium (III); Tris(dinapthoylmethane)-mono(phenanthroline)-europium (III); Tris(4-bromobenzoylmethane)-mono(phenanthroline)-europium (III); Tris(dibiphenoylmethane)-mono(phenanthroline)-europium (III); Tris(dibenzoylmethane)-mono(4,7-diphenylphenanthroline)-europium (III); and Tris(dibenzoylmethane)-mono(4,7-dimethylphenanthroline)-europium (III). Although those compounds fluoresce at about 612 nm, the subtle changes in ligand may lead to different absorption maxima that range from 330 to 380 nm Other suitable general ligand classes include those that contain oxo-, amino-, pyridino- or sulfoxo- ligands, such as, β-diketonates; bypyridines; macrocyclic bipyridines; crown ethers; phosphine oxides; and sulfonates. Additional ligands may include the cyclopentadienyl anion.

Absorption, emission, emission spectra and the like of compounds, images and the like can be determined, for example, using the Quality Engineering Associates, Inc. (QEA) image analysis system, PIAS-II (Billerica, Mass.). The PIAS-II system, which has a visualizing device and software to analyze images, can provide, for example, lightness values, such as, $L^*$, and the color values, red/green, $A^*$, and blue/yellow, $b^*$. $L^*$ can be a useful measure of fluorescence, and of quantifying fluorescence. Thus, herein, $L^*$ value is a measure of fluorescent intensity. In embodiments, the $L^*$ of a toner of interest is greater than about 50, greater than about 55, greater than about 60.

In embodiments, the pigment may be LUREDP7 fluorescent pigment (LuminoChem, Budapest, HU), where the LUREDP7 is a powder that is virtually invisible on paper, however, on exposure to UV-A and/or blue light (optimal effect achieved at approx. 380 nm), red fluorescence becomes visible (emission at approx. 618 nm).

In embodiments, pigment loading on a weight basis is an amount of at least about 3% of the toner weight, at least about 5% of the toner weight, at least about 10% of the toner weight, at last about 15% of the toner weight, or more.

Flocculant

In embodiments, aggregating (flocculating agents or flocculent) agents are included in forming toner particles of the present disclosure. Any aggregating agent capable of causing complexation might be used in forming toner of the present disclosure. In embodiments, multivalent salts can be selected to aggregate polyester colloids to form a toner particle. Examples of metal salts or cations which may be utilized as aggregating agent include acetates of vanadium, niobium, tantalum, chromium, molybdenum, tungsten, manganese, iron, ruthenium, cobalt, nickel, copper, zinc, cadmium or silver; acetoacetates of vanadium, niobium, tantalum, chromium, molybdenum, tungsten, manganese, iron, ruthenium, cobalt, nickel, copper, zinc, cadmium or silver; sulfates of vanadium, niobium, tantalum, chromium, molybdenum, tungsten, manganese, iron, ruthenium, cobalt, nickel, copper, zinc, cadmium or silver; and aluminum salts, such as, aluminum acetate, aluminum halides, such as, polyaluminum chloride, mixtures thereof and the like. Examples of metal salts include polyaluminum halides, such as, polyaluminum chloride (PAC), or the corresponding bromide, fluoride, or iodide, polyaluminum silicates, such as, polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxalate, calcium sulfate, magnesium acetate, magnesium nitrate, magnesium sulfate, zinc acetate, zinc nitrate, zinc sulfate, combinations thereof, and the like. In embodiments, suitable coagulants include a polymetal salt such as, for example, polyaluminum chloride (PAC), polyaluminum bromide or polyaluminum sulfosilicate. The polymetal salt can be in a solution of nitric acid or other diluted acid solutions, such as, sulfuric acid, hydrochloric acid, citric acid or acetic acid. The coagulant may be added in amounts from about 0.01 to about 0.5 pph by weight of the toner of metal ion, from about 0.2 to about 0.4 pph, from about 0.25 to about 0.37 pph of metal ion. In embodiments, the aggregating agent is an aluminum-containing material that is involved in gloss, such as, is aluminum sulfate, present at from about 0.20 pph to about 0.5 pph, as measured in parts of aluminum to parts of toner, from about 0.25 pph to about 0.45 pph, from about 0.3 pph to about 0.4 pph.

Stabilizer

A bio-based stabilizer is introduced before, during or after aggregation is complete to contribute to terminating particle aggregation and growth. The bio-based stabilizer comprises, for example, a polyol, as taught herein or as known in the art, or a polyhydroxylated organic acid or acid salt, such as, an aldopentose, an aldohexose and so on. The stabilizers of interest do not chelate, for example, metal ion. Hence, to control gloss, other reagents or tools are used to control, for example, metal ion content of a toner.

Suitable polyols may be selected from, for example, sugars, saccharides, oligosaccharides, polysaccharides, polyhydroxyacids and sugar alcohols, and portions of such polymers. Examples include, adonitol, arabitol, sorbitol, mannitol, galactose, galactitol, lactose, fructose, gluconic acid, lactobionic acid, isomaltose, inositol, lactitol, xylitol, maltitol, 1-methyl-glucopyranoside, 1-methyl-galactopyranoside, 1-methyl-mannopyranoside, erythritol, diglycerol, polyglycerol, sucrose, glucose, amylose, nystose, kestose, trehalose, raffinose, gentianose, combinations thereof and the like. Also, glycogen, a starch, a cellulose, a demineralized or unmodified chitin, a dextrin, a gelatin, a dextrose or other such polysaccharides, or fractions thereof, can be used. Those compounds generally are commercially available or can be obtained from natural sources, such as, crustacean shells, plants and so on, practicing known methods.

Suitable organic acids include, for example carboxylic acids, dicarboxylic acids and the like, that can carry any number of backbone carbon residues, such as, for example, 4 or more carbons, 5 or more carbons, 6 or more carbons, or more. Suitable such carboxylic acids include, for example, aldopentoses, aldohexoses, aldoheptoses and so on, and salts thereof, such as, citric acid, oxalic acid, benzoic acid, glucuronic acid, mellitic acid, tartaric acid, isomers thereof and the like. Hence, an example is gluconic acid or any derivatives thereof which include but are not limited to gluconic acid, sodium gluconate, glucono-Δ-lactone, calcium gluconate and potassium gluconate.

The stabilizer is added to an emulsion in amounts from at least about 0.5 parts per hundred (pph) based on the solids weight in the emulsion, at least about 1 pph, at least about 2 pph, at least 3 pph or more.

Additional Colorants

In embodiments, toners of the present disclosure may include a colorant. Such colorants include, for example, various known suitable colorants, such as dyes, pigments, mixtures of dyes, mixtures of pigments, mixtures of dyes and pigments and the like. The colorant may be included in the toner in an amount of, for example, about 0.1 to about 35% by weight of the toner, from about 1 to about 15 wt % of the toner, from about 3 to about 10% by weight of the toner.

As examples of suitable colorants, mention may be made of carbon black like REGAL 330®; magnetites, such as Mobay magnetites MO8029™ MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP604™, NP608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water-based pigment dispersions.

Specific examples of pigments include SUNSPERSE 6000, FLEXIVERSE and AQUATONE water based pigment dispersions from SUN Chemicals, HELIOGEN BLUE L6900™, D6840™, D7080™, D7020™ PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing and the like.

Wax

In addition to the polymer binder resin, the toners of the present disclosure also optionally contain a wax, which can be either a single type of wax or a mixture of two or more different waxes. A single wax can be added to toner formulations, for example, to improve particular toner properties, such as, toner particle shape, presence and amount of wax on the toner particle surface, charging and/or fusing characteristics, gloss, stripping, offset properties and the like. Alternatively, a combination of waxes can be added to provide multiple properties to the toner composition.

Optionally, a wax may also be combined with the resin and fluorescent agent in forming toner particles. When included, the wax may be present in an amount of, for example, from about 1 wt % to about 25 wt % of the toner particles, in embodiments, from about 5 wt % to about 20 wt % of the toner particles.

Waxes that may be selected include waxes having, for example, an Mw of from about 500 to about 20,000, in embodiments, from about 1,000 to about 10,000. Waxes that may be used include, for example, polyolefins such as polyethylene, polypropylene and polybutene waxes, such as, commercially available from Allied Chemical and Petrolite Corporation, for example, POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™ SUPERSLIP 6530™ available from Micro Powder Inc., fluorinated waxes, for example POLYFLUO 190™, POLYFLUO 200™, POLYSILK 19™ POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™ and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents.

In embodiments, the wax is one appropriate for use in a low melt toner, a ULM toner, a super low melt toner and so on. In embodiments, the wax is one with a melting point which is below the maximal temperature used during the toner particle formation process.

Other Additives

Further optional additives which may be combined with a toner include any additive to enhance the properties of toner compositions. Included are surface additives, color enhancers etc. Surface additives that can be added to the toner compositions after washing or drying include, for example, metal salts, metal salts of fatty acids, colloidal silicas, metal oxides, strontium titanates, combinations thereof and the like, which additives are each usually present in an amount of from about 0.1 to about 10 wt % of the toner, in embodiments, from about 0.5 to about 7 wt % of the toner. Examples of such additives include, for example, those disclosed in U.S. Pat. Nos. 3,590, 000, 3,720,617, 3,655,374 and 3,983,045, the disclosure of each of which hereby is incorporated by reference in entirety. Other additives include zinc stearate and AEROSIL R972® available from Degussa. The coated silicas of U.S. Pat. No. 6,190,815 and U.S. Pat. No. 6,004,714, the disclosure of each of which hereby is incorporated by reference in entirety, can also be selected in amounts, for example, of from about 0.05 to about 5% by weight of the toner, in embodiments, from about 0.1 to about 2% by weight of the toner. The additives can be added during the aggregation or blended into the formed toner product.

Toner Preparation

In embodiments, fluorescent agent-containing compositions may be prepared by emulsion aggregation. A mixture may be prepared by adding one or more amorphous resins, at least one crystalline resin or other materials, which may also be in a dispersion(s) including a surfactant, to the emulsion, which may be a mixture of two or more emulsions containing the resin. The pH of the resulting mixture may be adjusted by an acid, such as, for example, acetic acid, nitric acid or the like. In embodiments, the pH of the mixture may be adjusted to from about 2 to about 4.5. Additionally, in embodiments, the mixture may be homogenized. If the mixture is homogenized, homogenization may be accomplished by mixing at about 130 to about 135, about 130 to about 150, about 150 to about 160 rpm. Homogenization may be accomplished by any suitable means, including, for example, an IKA ULTRA TURRAX T50 probe homogenizer.

In embodiments, the fluorescent additive may be prepared by heating the amorphous resin and adding the fluorescent agent to form a first solution, which is then combined with an aqueous solution including a surfactant and a base. The aqueous solution may also be heated and may be homogenized. While the second solution is homogenized, the first solution of the amorphous resin and the fluorescent agent is added to form an emulsion, which may be homogenized, to produce a stable latex.

After emulsion, the mixture may be distilled to remove the solvent. The emulsion can be cooled to below or about room temperature, such as, from about 20° C. to about 25° C. The cooling may be rapid or slow, as desired. A suitable cooling method may include introducing cold water to a jacket around the reactor. After cooling, the fluorescent latex particles may be optionally filtered. Drying may be accomplished by any suitable method for drying including, for example, freeze drying.

Aggregation and Coalescence

The mixture of latex, lanthanide complex, optional wax and optional additional colorant, may be subsequently treated to form toner particles.

The pH of the mixture may be adjusted from about 2.5 to about 6 and in embodiments, from about 3.3 to about 5.5 with, for example, an acid. Suitable acids include, for example, nitric acid, sulfuric acid, hydrochloric acid, citric acid or acetic acid. The amount of acid added may be from about 4 to about 30% by weight of the mixture, in embodiments, from about 5 to about 15% by weight of the mixture.

In embodiments, aggregating (flocculating agents or flocculent) agents are included in forming toner particles of the present disclosure. The aggregating agent may be added over a period of time from about 1 minute to about 60 minutes, in embodiments, from about 1.25 minutes to about 20 minutes, depending on the processing conditions.

The temperature during aggregation is maintained at a temperature that provides for a deliberate and prolonged growth of particle size to enable adequate pigment loading.

Hence, the temperature during aggregation is less than about 40° C., less than about 37° C., less than about 35° C.

In embodiments, a shell may be included by adding a resin as taught herein or as known in the art to the developed core particles with an additional incubation. The temperature of the incubation can be increased slightly, such as, about 3° C., about 4° C., about 5° C. or more above the aggregation temperature.

In embodiments, following aggregation to a desired particle size, conditions are changed to free particle growth. Hence, particle growth can be curtailed by raising the pH of the reaction mixture. The pH may be adjusted to about 7.0 to about 9.5, from about 7.25 to about 9.25, from about 7.5 to about 9.0, using, for example, a dilute base, for example, but not limited to, NaOH, or a buffer, such as, a sodium acetate buffer. A stabilizer can be added to the slurry to contribute to particle growth cessation. A pH increase and a stabilizer can be used to freeze toner particle growth.

Following aggregation, the particles may be coalesced to provide more beneficial particle physical properties. Coalescing can occur by heating the mixture to a temperature of from about 64° C. to about 80° C., from 66° C. to about 75° C., from about 68° C. to about 73° C., for a period of from about 0.5 to about 6 hours, and in embodiments from about 2 to about 5 hours.

When the particles are of desired size, shape, circularity and so on, the coalescence process can be terminated, generally, by lowering the mixture temperature. The mixture may be cooled, and the particles sieved, filtered, washed and dried. Cooling may be at a temperature of from about 0° C. to about 20° C., from about 22° C. to about 40° C., in embodiments, from about 22° C. to about 30° C., over a period of from about 1 hour to about 8 hours, in embodiments, from about 1.5 hours to about 5 hours.

In embodiments, cooling a coalesced toner slurry includes quenching by adding a cooling medium such as, for example, ice, dry ice and the like, to effect rapid cooling to a temperature of from about 0° C. to about 20° C., about 20° C. to about 40° C., in embodiments, from about 22° C. to about 30° C.

The coalesced toner may then be washed. The washing may be carried out at a pH of from about 6.5 to about 6.8, in embodiments, at a pH of from about 6.0 to about 7.0. The washing is at a temperature of from about 20° C. to about 25° C. The washing may include filtering and reslurrying a filter cake including toner particles in deionized water. The filter cake may be washed one or more times by deionized water and followed optionally by one or more deionized water washes.

The washed slurry may then be dried. Drying may be carried out at a temperature of from about 20° C. to about 75° C., in embodiments, of from about 45° C. to about 60° C. The drying may be continued until the moisture level of the particles is below a set target of about 1% by weight, in embodiments of less than about 0.7% by weight.

Reaction Conditions

The fluorescent lanthanide complexes of the present disclosure may be combined with a latex resin, optional waxes, stabilizers, surfactants and other additives, utilizing any method within the purview of those skilled in the art to form toner particles. In embodiments, an emulsion aggregation (EA) method may be utilized whereby toners may be formed by incorporating a colorant with a latex polymer formed by emulsion polymerization. Examples of emulsion/aggregation/coalescing processes for the preparation of toners are illustrated in U.S. Pat. Nos. 5,403,693, 5,418,108, 5,364,729, and 5,346,797, the disclosure of each of which hereby is incorporated by reference in entirety. Other processes are disclosed in U.S. Pat. Nos. 5,527,658, 5,585,215, 5,650,255, 5,650,256 and 5,501,935, the disclosure of each of which hereby is incorporated by reference in entirety.

In other embodiments, a phase inversion process may be utilized to form toner particles. Such a process may include forming an emulsion including a disperse phase possessing a first composition and a continuous phase including molten one or more ingredients of a toner composition, performing a phase inversion to create a phase inversed emulsion including a disperse phase including toner-sized droplets possessing the molten one or more ingredients of the toner composition and a continuous phase including a second composition, and solidifying the toner-sized droplets to result in toner particles. The disperse and continuous phases may possess solvents, including ketones and/or alcohols to dissolve the resins or, in embodiments, may be solvent-free, in which case aqueous compositions may be utilized. Such solvent-free processes are disclosed, for example, in U.S. Publ. No. 2007/0141494, the disclosure of which is hereby incorporated by reference in entirety. Such a phase inversed emulsion may include a disperse phase including toner-sized droplets possessing molten ingredients of a toner composition and a continuous phase including an aqueous composition.

In embodiments, a polyester resin emulsion may be generated by a solvent flashing method by, for example, dissolving the polyester in a solvent, such as ketones and/or alcohols. In other embodiments, the polyester may be dissolved in a water miscible solvent, such as acetone, tetrahydrofuran, combinations thereof, and the like. The resin and solvent may, in embodiments, be mixed with water at a temperature of, for example, from about 30° C. to less than about 70° C., in embodiments, from about 35° C. to about 70° C., whereby the solvent is removed by distillation thereof and thereby permitting the formation of the polyester in water as a stable emulsion, and thereafter mixing the polyester obtained with a colorant and accomplishing aggregation and coalescence thereof as illustrated herein and as disclosed, for example, in U.S. Pat. Nos. 7,029,817, 5,290,654, 5,278,020, 5,308,734, 5,370,963, 5,344,738, 5,403,693, 5,418,108, 5,364,729, 5,346,797, 5,348,832, and 5,405,728, the disclosure of each of which hereby is incorporated by reference in entirety.

Toner Particles

Once obtained, a latex resin described above may be utilized to form a toner. In embodiments, the toners may have a core-shell structure, where the core can comprise at least one amorphous resin, optionally a crystalline resin, and the shell may comprise at least one amorphous resin. In embodiments, the amorphous resins in the core and the shell may be the same or different. Optionally, such core and shell resins may comprise one or more surfactants, additives, colorants, stabilizers, waxes and the like.

Toner particles produced utilizing a latex of the present disclosure may have a size of about 4.5 μm to about 9 μm, in embodiments, from about 5 μm to about 8.5 μm, in embodiments, about 5.5 μm to about 8 μm; circularity of from about 0.9 to about 0.99, in embodiments, from about 0.92 to about 0.98, as determined as known in the art, such as, using a Sysmex flow particle image analyzer, such as, the FPIA 2100 or 3000; a volume average diameter (also referred to as, "volume average particle diameter") of from about 3 to about 20) n, in embodiments, from about 4 to about 15 μm, in embodiments, from about 5 to about 13 um; and a number average geometric standard deviation ($GSD_n$) and/or a volume average geometric standard deviation ($GSD_v$) of from about 1.34 to about 1.49, in embodiments, from about 1.32 to about 1.41.

The characteristics of the toner particles may be determined by any suitable technique and apparatus. Volume average particle diameter, d50v, $GSD_v$ and $GSD_n$ may be measured by a measuring instrument, such as, a Beckman Coulter MULTISIZER 3.

In embodiments, an ionic crosslinker may be added to the toner compositions to further adjust the desired gloss of the toner compositions. Such ionic crosslinkers include, for example, $Al^{3+}$ crosslinkers, including aluminum sulfate ($Al_2(SO_4)_3$), polyaluminum chloride, polyaluminum sulfosilicate and combinations thereof. The degree of ionic crosslinking may be influenced by the amount of retained metal ion, such as $Al^{3+}$, in the particle. In embodiments, the amount of retained crosslinker, for example $Al^{3+}$, in toner particles of the present disclosure may be from about 50 parts per million (ppm) to about 1000 ppm, in embodiments, from about 500 ppm to about 800 ppm.

The resulting toners may be, in embodiments, a clear toner under normal light having a low and tunable gloss level, which contains red fluorescence materials in the visible spectrum range on appropriate UV excitation. Utilizing the materials and methods of the present disclosure, one can thus produce invisible prints by matching the gloss level of the toner with the substrate to which the toner is to be applied. Thus, for example, the gloss level of a toner of the present disclosure may be adjusted from matte to gloss on paper, having a gloss as measured by Gardner gloss units (gu) of from about 5 gu to about 90 gu, in embodiments, from about 15 gu to about 80 gu.

Thus, in embodiments, an electrophotographic image produced with a toner of the present disclosure may be invisible and have substantially no differential gloss between the toner and paper to which the toner is applied when exposed to visible light, but the toner becomes visible when exposed to UV light as described above. In embodiments, images produced with toners of the present disclosure become visible when exposed to light at wavelengths of from about 200 nm to about 400 nm, in embodiments, from about 250 nm to about 375 nm. As used herein, "no differential gloss," means that the difference in gloss units between a substrate, such as, a paper, and the toner may be less than about 15 gu, in embodiments, less than about 10 gu, in embodiments, less than about 5 gu.

Advantages of toners of the present disclosure include use as invisible, under ambient light, watermarks, which become visible under appropriate incident UV light, are presented in solid form as compared to liquid inks currently used, the simplified design of the electrophotographic machine and the ability to apply the toners of the present disclosure with such an electrophotographic machine.

Developers

The toner particles thus formed may be formulated into a developer composition. The toner particles may be mixed with carrier particles to achieve a two component developer composition. The toner concentration in the developer may be from about 1% to about 25% by weight of the total weight of the developer, in embodiments, from about 2% to about 15% by weight of the total weight of the developer.

Carriers

Examples of carrier particles that can be utilized for mixing with the toner include those particles that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide and the like. Other carriers include those disclosed in U.S. Pat. Nos. 3,847,604, 4,937,166, and 4,935,326.

The selected carrier particles can be used with or without a coating. In embodiments, the carrier particles may include a core with a partial or complete coating thereover which may be formed from a mixture of polymers that are not in close proximity thereto in the triboelectric series. The coating may include fluoropolymers, such as polyvinylidene fluoride resins, terpolymers of styrene, methyl methacrylate, and/or silanes, such as triethoxy silane, tetrafluoroethylenes, other known coatings and the like. For example, coatings containing polyvinylidenefluoride, available, for example, as KYNAR 301F™, and/or polymethylmethacrylate, for example having a weight average molecular weight of about 300,000 to about 350,000, such as commercially available from Soken, may be used. In embodiments, polyvinylidenefluoride and polymethylmethacrylate (PMMA) may be mixed in proportions of from about 30 to about 70 weight % to about 70 to about 30 weight %, in embodiments from about 40 to about 60 weight % to about 60 to about 40 weight %. The coating may have a coating weight of, for example, from about 0.1 to about 5% by weight of the carrier, in embodiments, from about 0.5 to about 2% by weight of the carrier.

Various effective suitable means can be used to apply the polymer to the surface of the carrier core particles, for example, cascade roll mixing, tumbling, milling, shaking, electrostatic powder cloud spraying, fluidized bed, electrostatic disc processing, electrostatic curtain, combinations thereof and the like. The mixture of carrier core particles and polymer may then be heated to enable the polymer to melt and to fuse to the carrier core particles. The coated carrier particles may then be cooled and thereafter classified to a desired particle size.

In embodiments, suitable carriers may include a steel core, for example of from about 25 to about 100 µm in size, in embodiments, from about 50 to about 75 µm in size, coated with about 0.5% to about 10% by weight, in embodiments, from about 0.7% to about 5% by weight of a conductive polymer mixture including, for example, methacrylate, and optionally, a conductive material, such as, a carbon black, using the process described in U.S. Pat. Nos. 5,236,629 and 5,330,874.

The carrier particles can be mixed with the toner particles in various suitable combinations. The concentrations are may be from about 1% to about 20% by weight of the toner composition. However, different toner and carrier percentages may be used to achieve a developer composition with desired characteristics.

Imaging

The toners can be utilized for electrophotographic processes or applied using such processes and devices, including those disclosed in U.S. Pat. No. 4,295,990, the disclosure of which is hereby incorporated by reference in entirety. In embodiments, any known type of image development system may be used in an image developing device, including, for example, magnetic brush development, jumping single component development, hybrid scavengeless development (HSD) and the like. Those and similar development systems are within the purview of those skilled in the art.

Imaging processes include, for example, preparing an image with an electrophotographic device including a charging component, an imaging component, a photoconductive component, a developing component, a transfer component and a fusing component. The electrophotographic device may include a high speed printer, a black and white high speed printer, a color printer, and the like.

Once the image is formed with toners/developers via a suitable image development method such as any one of the aforementioned methods, the image may then be transferred to an image receiving medium such as paper and the like. In embodiments, the toners may be used in developing an image in an image developing device utilizing a fuser roll member. Fuser roll members are contact fusing devices that are within the purview of those skilled in the art, in which heat and pressure from the roll may be used to fuse the toner to the image-receiving medium. In embodiments, the fuser member may be heated to a temperature above the fusing temperature of the toner, for example to temperatures of from about 70° C. to about 160° C., in embodiments, from about 80° C. to about 150° C., in embodiments, from about 120° C. to about 210° C., after or during melting onto the image receiving substrate.

In embodiments, for color printing, multiple colored toners may be utilized to form images. In embodiments, the toners may include, in addition to the fluorescent toner of the present disclosure, pure primary colorants of cyan, magenta, yellow and black. In embodiments, additional colors may be utilized, including red, blue and green, in addition to the primary colors of cyan, magenta and yellow. Any of the known colorants can be included with the fluorescence compound of interest in a toner to provide a bifunctional colored and fluorescent toner. In other embodiments, a clear toner of interest can be delivered in an image-wise presentation with other colored toners.

The following Examples are being submitted to illustrate embodiments of the present disclosure. The Examples are intended to be illustrative only and are not intended to limit the scope of the present disclosure. Parts and percentages are by weight unless otherwise indicated. As used herein, "room temperature," refers to a temperature of from about 20° C. to about 30° C. "Resin A" and "Resin B" refer to distinct amorphous copolymers of alkoxylated bisphenol A with fumaric acid, terephthalic acid and alkenylsuccinic acid comonomers. For example, resin A has an $M_w$=19,400 and a $T_g$ onset=60° C.

EXAMPLES

Comparative Example 1

Toner with 3.38% Pigment Loading, 0.25 pph Al/Toner Ratio, 1 pph Gluconic Acid Sodium Salt/Toner Ratio and 70° C. Coalescence Temperature.

An emulsion of 8:1 ratio Resin A to LUREDP7 (LuminoChem, Budapest, HU) pigment (26.5 g resin & 3.38 g pigment), Resin B latex (75 g), crystalline polyester latex (18 g), Dowfax 2A1(1.8 g), IGI wax dispersion (31 g) and deionized water (320 g) were combined and adjusted to pH 4.2 with dilute $HNO_3$. The mixture was stirred under high shear using an IKA ULTRA TURRAX homogenizer and then 0.9 g of aluminum sulfate solution (28%) in 24 g of deionized water was added slowly. The resulting more viscous mixture was placed in a heating mantle and stirred at 190-210 rpm while being heated slowly to 45° C. A shell mixture consisting of Resin A latex (43.5 g), Resin B latex (39.5 g), Dowfax 2A1 (0.3 g) and deionized water (29 g) was added and the pH adjusted 4.0 with dilute NaOH when the average particle size reached approximately 5.0 µm. RPM was increased to 230 and slow heating continued until an average particle size of 5.9 µm was reached. The pH was then adjusted to 7.8 with dilute NaOH, a solution of 1 g gluconic acid sodium salt in 25 g deionized water was added and the stirring reduced to 150 rpm. The temperature was slowly increased to 70° C. At 60° C. the pH was increased to 8.4 and maintained for coalescence. Coalescence temperature was maintained for 40 minutes after which the mixture was acidified to pH 6.8 by slowly adding 6M sodium acetate buffer. Heating was discontinued when the particles achieved the desired roundness (appearance under light microscope) and the mixture was poured unto crushed ice.

The cooled reaction mixture was sieved through a 25 µm pore metal sieve, filtered and resuspended in deionized water. The wash was repeated twice. The washed toner particles were filtered and freeze dried to yield parent toner particles with reduced fluorescent intensity (appeared faint pink under UV radiation), average particle size (d50) of 6.55 µm, $GSD_v$ of 1.39 and $GSD_n$, of 1.32.

Comparative Example 2

Toner with 3.3 wt % Pigment Loading, 0.25 pph Al/Toner Ratio, 1 pph Gluconic Acid Sodium Salt/Toner Ratio and 70° C. Coalescence Temperature The general procedure for comparative Example 1 was followed, however, the pH was adjusted to 7.5 during freezing and maintained for coalescence. The parent toner particles had reduced fluorescent intensity (appeared faint pink under UV radiation), average particle size (d50) of 8.28 um, $GSD_v$ of 1.49 and $GSD_n$ of 1.34.

Comparative Example 3

Toner with 3.47 wt % Pigment Loading, 0.5 pph Al/Toner Ratio, 3.0 pph EDTA/Toner Ratio and 85° C. Coalescence Temperature The process and materials of Comparative Example 1 were practiced with the following changes. Emulsion of 7.6:1 ratio Resin A to LUREDP7 pigment (26.4 g resin & 3.47 g pigment), Resin B latex (73 g), crystalline polyester latex (20 g), Dowfax 2A1(1.8 g), IGI wax dispersion (31 g) and deionized water (354 g) were combined and adjusted to pH 4.2 with dilute $HNO_3$. A shell mixture consisting of Resin A latex (43 g), Resin B latex (39 g), Dowfax 2A1 (0.3 g) and deionized water (30 g) was added when the average particle size reached approximately 5.1 µm. About 7.7 g of VERSENE were added, the stirring reduced to 150 rpm and the pH was then adjusted to 7.5 with dilute NaOH. The temperature was increased to 85° C. At 60° C., the particles reached an average particle size of 6.1 µm. However, between 60 to 70° C., particles grew so rapidly and became too large to be sieved through the 25 µm pore metal sieve. The fluorescent intensity was also reduced to a faint pink.

Example 1

Toner with 10 wt % Pigment Loading, 0.3 pph Al/Toner Ratio, 1.7 pph Gluconic Acid Sodium Salt/Toner Ratio and 70° C. Coalescence Temperature The materials and methods of Comparative Example 1 were practiced with the following changes. Resin A latex (64 g), Resin B latex (62 g), crystalline polyester latex (19 g), Dowfax 2A1(0.6 g), IGI wax dispersion (30 g), deionized water (372 g) and LUREDP7 pigment dispersion (59 g) were combined and adjusted to pH 4.2 with dilute $HNO_3$. About 1.1 g of aluminum sulfate solution (28%) in 29 g of deionized water was added slowly. Aggregation was at about 35° C. At 31° C., a shell mixture consisting of Resin A latex (39 g), Resin B latex (38 g), Dowfax 2A1 (0.3 g) and deionized water (36 g) was added and the pH adjusted 4.0 with dilute NaOH; the average particle size reached was approximately 5.0 µm. Slow heating continued and an average particle size of 5.8 µm was reached at 33° C. About 1.7 g gluconic acid sodium salt in 25 g deionized water were added and the stirring reduced to 135 rpm. The temperature was slowly increased to 70° C. At 50° C. the pH was increased to 8.9 and maintained for coalescence. Heating was discontinued when the particles achieved the desired roundness (appearance under light microscope) and the mixture was poured unto crushed ice.

The washed toner particles were filtered and freeze dried to yield red fluorescent parent toner particles with average particle size (d50) of 6.15 µm, $GSD_v$ of 1.37 and $GSD_n$ of 1.41.

Example 2

Toner with 10 wt % Pigment Loading, 0.3 pph Al/Toner Ratio, 1.2 pph Gluconic Acid Sodium Salt/Toner Ratio and 70° C. Coalescence Temperature The materials and methods of Comparative Example 1 were practiced aside from the following changes. A solution of 1.2 g gluconic acid sodium salt in 25 g deionized water was added and the stirring reduced to 130 rpm. The temperature was slowly increased to 70° C. At 45° C. the pH was increased to 8.9 and maintained to coalescence temperature.

The washed toner particles were filtered and freeze dried to yield red fluorescent parent toner particles with average particle size (d50) of 6.61 µm, $GSD_v$ of 1.33 and $GSD_n$ of 1.43.

Example 3

Toner with 10 wt % Pigment Loading, 0.36 pph Al/Toner Ratio, 1.4 pph Gluconic Acid Sodium Salt/Toner Ratio and 70° C. Coalescence Temperature The general procedure for Example 2 was followed, however the pH was increased to 8.4 at 50° C. and maintained for coalescence. The process yielded red fluorescent parent toner particles with average particle size (d50) of 8.47 µm, $GSD_v$ of 1.38 and $GSD_n$ of 1.39.

Example 4

Fusing Assessment

Samples of two experimental toners were evaluated by making unfused images at 0.5 TMA on three test substrates, Digital Color Elite Gloss paper (Xerox), Color Expressions Plus paper (Xerox) and a polyolefin-based synthetic substrate. Samples were then fused using an offline commercially available fusing fixture. A commercially available black toner was used as a control.

Toners of Comparative Example 1 and Example 2 had lower gloss than the black control on all three substrates. Both experimental samples had lower gloss on the DCEG substrate and higher gloss on the synthetic substrate, at all temperatures. Both experimental samples had a wide fusing latitude (low cold offset temperature and no signs of hot offset).
Charging Assessment Charging data for the toner of Example 3 was lower than that of the black toner control. The experimental toner of Example 3 with increased pigment loading of 10% had better charge than a red fluorescent control with 4% loading of the pigment DFKY-C7 (Risk Reactor) in 10.9 µm particles.
Fluorescence Intensity Measurements As shown in the table below, the toner of Example 2 has an L* value of approximately 60 which is significantly higher than the value for the toner of Comparative Example 2 and the control red fluorescence toner. The fluorescence intensity of Experimental Toner 2 is 50% higher than the value for the control sample. Fusing temperature and lamination had no effect on fluorescence intensity.

TABLE 1

| | Fluorescence Intensity | |
|---|---|---|
| Sample | L* - observed under UV light | wt % pigment loading |
| Example 2 | 60 | 10 |
| Comparative Example 2 | 32 | 3.3 |
| Control red fluorescent toner | 29 | 4 |

Print gloss versus fusing temperature comparisons revealed lower gloss levels on substrates DCEG, CX+ and synthetic substrate as compared to the black toner control. The toner of Example 3 with increased pigment loading showed better charge than the red fluorescence control toner.

Example 5

The general procedure of Example 2 was followed except that 5 g hydroxyiminodisuccinic acid (HIDS) was used in place of gluconic acid sodium salt. The reaction pH was 8.1 and maintained at that level for 30 mins at 70° C., after which dilute nitric acid was added slowly to lower the pH to 6.9 over approximately one hour. The final particles had average particle size (D50) of 5.71 µm, GSDv of 1.24 and GSDn of 1.25.

Example 6

The general procedure of Example 4 was used except that the reaction scale was approximately 35 times larger. The final particles had average particle size (D50) of 5.15 µms, GSDv of 1.24, GSDn of 1.25, and mean circularity of 0.950.

Example 7

Due to spectrometer constraints with very bright fluorescent prints, it can be useful to measure fluorescence intensity in a single color channel using a neutral density (ND) filter. Thus, the fluorescence intensity of solid area prints using the toners of Examples 4 and 5 was measured with the red channel of the QEA PIAS-II system with a 0.9 ND filter. The data in Table 2 are reported as the ratio of the observed fluorescence of the toner to the background fluorescence of the paper substrate.

TABLE 2

| | Fluorescence Intensity | |
|---|---|---|
| Sample | Fluorescence Intensity Ratio | wt % pigment loading |
| Example 4 | 4.1 | 10 |
| Example 5 | 4.5 | 10 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported

We claim herein:

1. A UV red fluorescent toner comprising a pigment comprising a lanthanide complex in an amount of at least about 3 wt %, at least one amorphous resin, an optional crystalline resin, an aggregating agent, a stabilizer that does not chelate metal ions, wherein the stabilizer comprises a salt of gluconic acid selected from sodium gluconate or potassium gluconate, optionally a surfactant and optionally a wax, wherein the toner exhibits an absorption $\lambda_{max}$ of between about 330 nm to 380 nm and an emission $\lambda_{max}$ of between about 612 nm to about 618 nm.

2. The UV red fluorescent toner of claim 1, wherein the lanthanide complex is a europium (III) complex selected from the group consisting of tris(dibenzoylacetonato)-mono(phenanthroline)-europium (III); tris(dibenzoylmethane)-mono(phenanthroline)-europium (III); (tris(dibenzoylmethane)-mono(5-aminophenanthroline)-europium (III); tris(dinapthoylmethane)-mono(phenanthroline)-europium (III); tris(4-bromobenzoylmethane)-mono(phenanthroline)-europium (III); tris(dibiphenoylmethane)-mono(phenanthroline)-europium (III); tris(dibenzoylmethane)-mono(4,7-diphenylphenanthroline)-europium (III); and tris(dibenzoylmethane)-mono(4,7-dimethylphenanthroline)-europium (III).

3. The UV red fluorescent toner of claim 1, which is clear under normal light.

4. The UV red fluorescent toner of claim 1, wherein said salt of gluconic acid is sodium gluconate.

5. The UV red fluorescent toner of claim 1, wherein the amorphous resin is selected from the group consisting of polyesters, polyamides, polyimides, polyolefins, polyethylene, polybutylene, polyisobutyrate, ethylene-propylene copolymers, ethylene-vinyl acetate copolymers, polypropylene, and combinations thereof.

6. The UV red fluorescent toner of claim 1, comprising a crystalline resin, wherein the crystalline resin is selected from the group consisting of polyesters, polyamides, polyimides, polyolefins, polyethylene, polybutylene, polyisobutyrate, ethylene-propylene copolymers, ethylene-vinyl acetate copolymers, polypropylene, and combinations thereof.

7. The UV red fluorescent toner of claim 1, wherein the toner comprises a core-shell configuration.

8. The UV red fluorescent toner of claim 7, wherein the shell comprises at least one amorphous resin.

9. The UV red fluorescent toner of claim 8, wherein the shell and the core comprise the same at least one amorphous resin.

10. The UV red fluorescent toner of claim 1, wherein the lanthanide complex comprises an absorption $\lambda_{max}$ of about 380 am and an emission $\lambda_{max}$ of about 618 nm.

11. The UV red fluorescent toner of claim 1, wherein the toner comprises an L* of at least about 50.

12. A UV red fluorescent clear toner comprising a pigment containing a europium (III) complex in an amount of at least about 3 wt %, at least one amorphous resin, an optional crystalline resin, an aggregating agent, a stabilizer that does not chelate metal ions, wherein the stabilizer comprises a salt of gluconic acid selected from sodium gluconate or potassium gluconate, optionally a surfactant and optionally a wax, wherein the europium (III) complex is selected from the group consisting of tris(dibenzoylacetonato)-mono(phenanthroline)-europium (III); tris(dibenzoylmethane)-mono(phenanthroline)-europium (III); tris(dibenzoylmethane)-mono(5-aminophenanthroline)-europium (III); tris(dinapthoylmethane)-mono(phenanthroline)-europium (III); tris(4-bromobenzoylmethane)-mono(phenanthroline)-europium (III); tris(dibiphenoylmethane)-mono(phenanthroline)-europium (III); tris(dibenzoylmethane)-mono(4,7-diphenylphenanthroline)-europium (III); and tris(dibenzoylmethane)-mono(4,7-dimethylphenanthroline)-europium (III), and wherein the toner exhibits an absorption $\lambda_{max}$, of between about 330 nm to 380 nm and an emission $\lambda_{max}$ of between about 612 nm to about 618 am.

13. The UV red fluorescent clear toner of claim 12, Wherein the toner is Clear under normal light.

14. The UV red fluorescent clear toner of claim 12, wherein said salt of gluconic acid is sodium gluconate.

15. The UV red fluorescent clear of 12, wherein the toner comprises an L* of at least about 50.

* * * * *